Dec. 9, 1924.  
F. C. KRAMER  
COOKING APPARATUS  
Filed Dec. 26, 1923  
1,518,206  
3 Sheets-Sheet 3
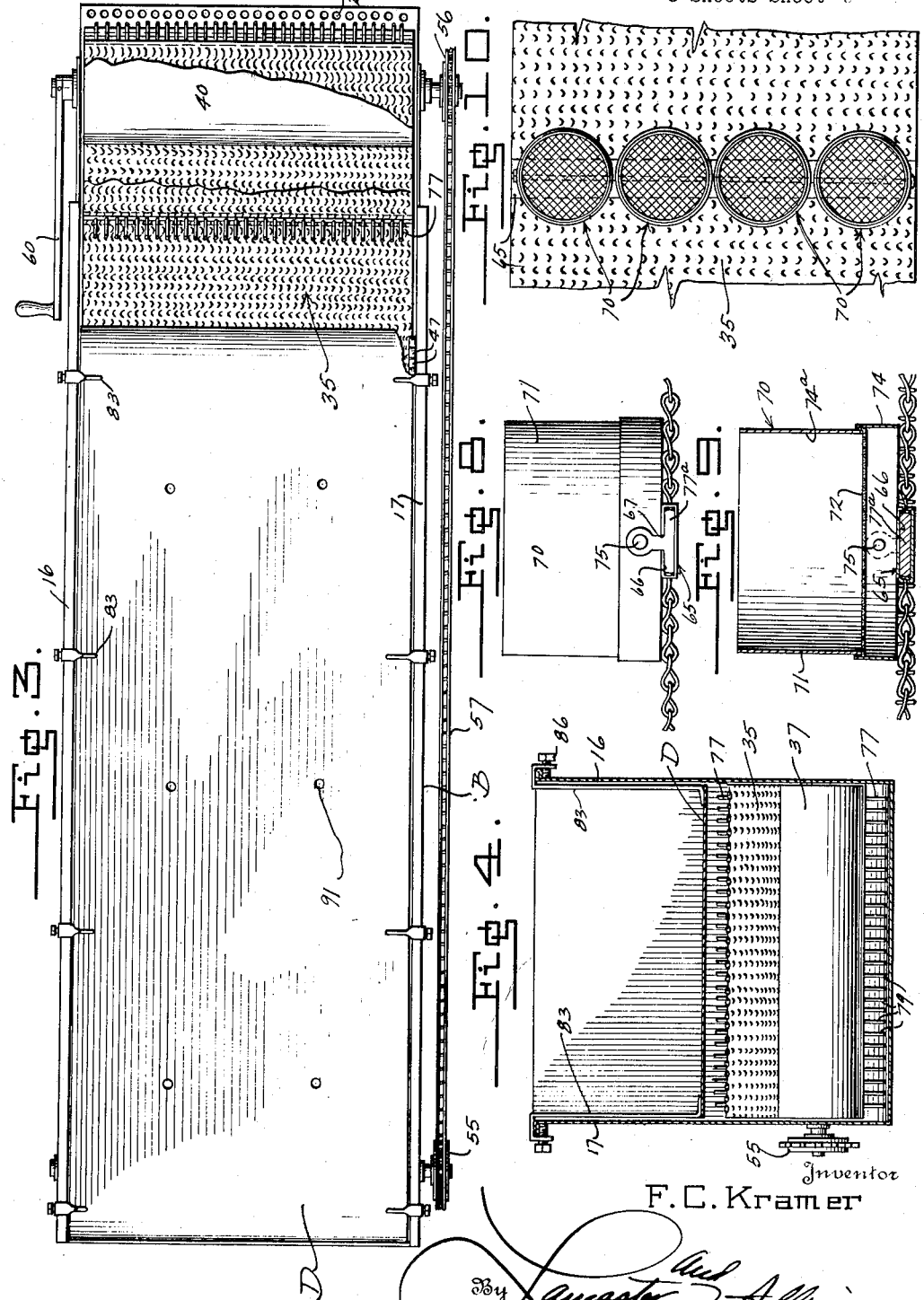

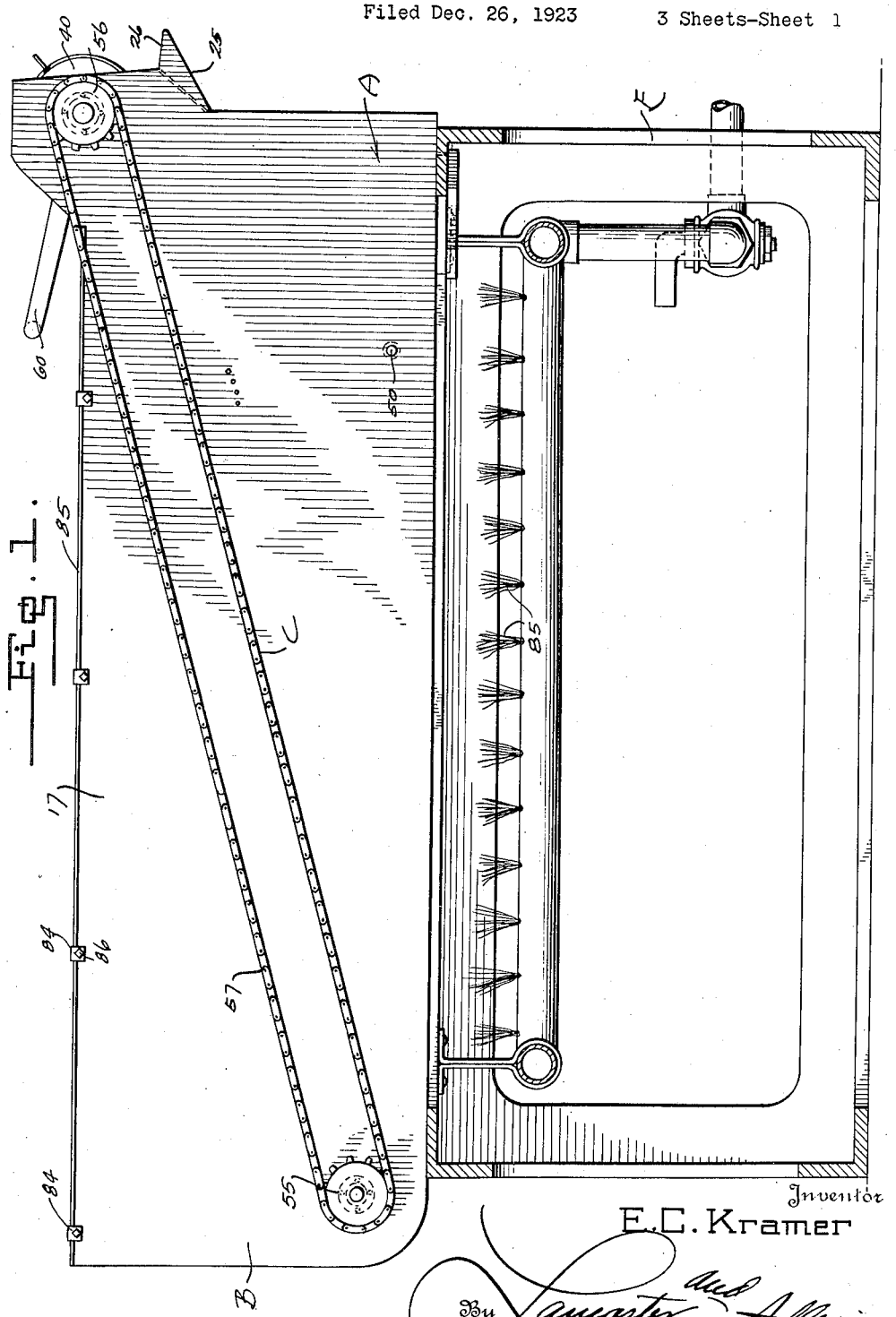

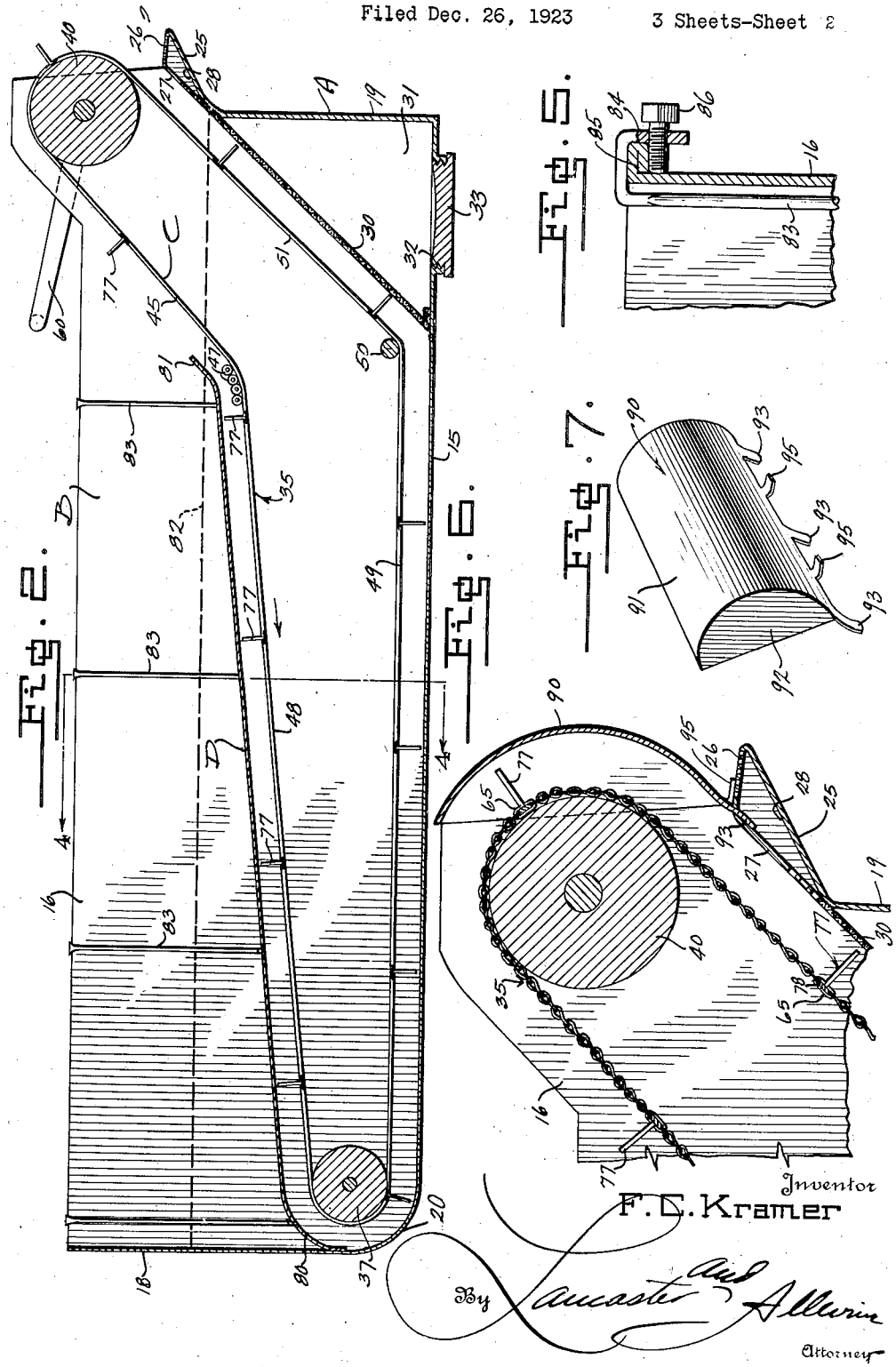

Patented Dec. 9, 1924.

1,518,206

UNITED STATES PATENT OFFICE.

FRANK C. KRAMER, OF KIRKSVILLE, MISSOURI.

COOKING APPARATUS.

Application filed December 26, 1923. Serial No. 682,778.

*To all whom it may concern:*

Be it known that I, FRANK C. KRAMER, a citizen of the United States, residing at Kirksville, in the county of Adair and State of Missouri, have invented certain new and useful Improvements in a Cooking Apparatus, of which the following is a specification.

This invention relates to improvements in cooking apparatus.

The primary object of this invention is the provision of a device which may be used for the preparation of various articles of food, having certain interchangeable features by means of which such food stuffs as fried cakes, doughnuts, Saratoga chips, French fried potatoes, or shoe string potatoes may be cooked in facile manner.

A further object of this invention is the provision of cooking apparatus of the above mentioned character which is primarily adapted for use in the culinary departments of restaurants and hotels to facilitate and expedite the cooking of various food stuffs.

A further object of this invention is the provision of cooking apparatus of the above mentioned character which embodies several interchangeable features to best facilitate the cooking of various articles and foods, being particularly designed to perform the cooking operation in an effective sanitary manner.

Other objects and advantages of this invention will be apparent during the course of the following detailed description.

In the accompanying drawings, forming a part of this specification, and wherein similar reference characters designate corresponding parts throughout the several views.

Figure 1 is a side elevation of the improved cooking apparatus, showing the same supported upon a stove or other burner.

Fig. 2 is a longitudinal cross sectional view taken through the improved cooking apparatus.

Fig. 3 is a plan view, partly in section, of details of the improved cooking apparatus.

Fig. 4 is a cross sectional view taken substantially on the line 4—4 of Figure 2.

Fig. 5 is an enlarged fragmentary view, partly in cross section, showing certain supporting construction of the improved apparatus.

Fig. 6 is an enlarged fragmentary view, partly in cross section, showing the cooking apparatus at its dispensing end, with means for guiding the various articles of food through the apparatus for continuous travel until the cooking operation has been finished.

Fig. 7 is a perspective view of a novel guide member used at the dispensing end of the improved cooking apparatus, as is illustrated in Figure 6 of the drawings.

Fig. 8 is a side elevation of a novel type of cup member used on the conveyor means of the improved apparatus for receiving such articles as doughnuts, fried cakes, and the like.

Fig. 9 is a cross sectional view taken through the cup shaped member illustrated in Figure 8.

Fig. 10 is a plan view of certain conveyor means embodied in the improved cooking apparatus, showing the arrangement of the cup shaped members illustrated in Figure 8.

In the drawings, wherein for the purpose of illustration is shown but the preferred embodiment of this invention, the letter A may generally designate the improved cooking apparatus, which may consist of a receptacle, or frame B, within which is mounted certain conveyor means C for the selective reception of various articles of food stuffs. A detachable guide member D is used in connection with the improved conveyor means and the vat B. The improved cooking apparatus A may be adapted for support upon any type of stove or burner mechanism E.

Referring to the vat or frame B, the same is preferably polygonal in formation, including the bottom 15; upstanding side walls 16 and 17; front end wall 18; and rear end wall 19. The walls of this vat B are preferably formed of sheet metal, and the juncture of the bottom wall 15 with the front wall 18 is arcuated, as at 20, for the proper cooperation of the conveyor means C as will be subsequently mentioned. The dispensing and inserting end of the receptacle B is adjacent the rear wall 19, and this wall 19 is relatively shorter than the front wall 18. The rear wall 19 at the upper end thereof is outturned, as at 25 at an obtuse angle to the plane of the wall 19, and is thence bent to provide a perforate article dispensing shelf 26, the material of which the wall 19 is formed being bent inwardly from the shelf 26 to provide a perforate guide wall 27 disposed at an obtuse angle to the wall 19. The wall portions 25 and 27 and the shelf 26 provide a strainer compartment 28 to receive grease, fat, and the like which drain from the articles of food as they are dispensed; the articles of food passing over the perforate shelf 26 so that the fats or grease may drain into the compartment 28 and from thence flow over the wall 25 and through the perforations at the lower end of the guide wall 27, and as will be subsequently described. The improved receptacle or vat B is entirely open at the top thereof.

A perforate screen 30 is preferably detachably supported in the rear end of the frame or vat B, being disposed in a plane continuous with the plane of the wall 27, and subdividing the main compartment of the vat B to provide a sediment receiving compartment 31 adapted to receive grit, and other particles or crumbs of food matter incident to moving of the food stuffs during the dispensing action; this foreign material dropping through the screen 30 into the compartment 31, from whence it may be removed thru the opening 32 in the bottom 15 of the vat B; a plug 33 being provided for detachable connection in the opening 32.

Referring to the conveyor means C, the same preferably includes a belt 35, which is formed of interconnected links or wires to provide an imperforate belt or conveyor. A forward roller 37 is rotatably supported by the vat B, having the ends thereof rotatably mounted in the side walls adjacent the front wall 18, and at the lower corner of this vat, so that the axis of the roller 37 is concentric with the arcuation 20 of the vat or receptacle B. At the rear end of the receptacle B, the belt 35 is trained over a roller 40 which is rotatably supported by the side walls 16 and 17 at the top of the receptacle or vat B; this roller 40 being rotatably mounted in the side walls of the vat above the dispensing shelf 26. From the roller 40 the belt 35 is sharply inclined at an acute angle to the vertical, providing a top run 45 which is exposed from the top of the vat B, and upon which run 45 the operator places the articles of food stuff. A series of rollers or the like 47 are carried at opposite sides of the vat B, by the side walls 16 and 17, just extending inwardly of the vat compartment sufficient to permit the belt to be angularly inclined. From these rollers 47 to the roller 37, the run 48 of the belt 35 is downwardly inclined at a very acute angle to the horizontal. After passing about the roller 37 the belt run 49 thereof is horizontal to a point adjacent the diagonal sediment screen 30. Within the enclosed area of the belt 35, a roller 50 is carried by the vat or receptacle B, and the belt is trained about this roller 50 and is upwardly inclined, as at 51, parallel to the strainer 30 and the wall 27.

Any approved means for driving of the belt 35 may be provided, and so that the rollers 37 and 40 may be synchronously operated it is preferred to provide sprocket wheels 55 and 56, respectively connected to the rollers 37 and 40 exteriorly of the vat or receptacle B, and about which is trained a chain 57. A crank or operating handle 60 is preferably connected to the roller 40 at one end thereof, so that the belt 35 may be manually operated, although it is to be understood that the belt 35 may be motor operated, thermostatically operated, or moved in any approved manner.

Referring to certain novel features of the belt 35, which renders the cooking apparatus practical for the preparation of various articles of food stuffs, it is preferred that the belt 35, at spaced intervals thereon support substantially channel shaped guide members 65, providing pockets 66 therein which are open through a reduced slot 67 at the outside of the belt 35; thus providing guide ways for the detachable reception of various article holding devices. These guide ways or members 65 are carried transversely of the belt 35, at intervals of about 12 inches, and the slots or ways 66 are open at the ends of the same to permit the lateral insertion of the food holding members. When it is desired to use the improved cooking device for the cooking of fried cakes, doughnuts, or the like, substantially cup-shaped members 70 are provided for detachable mounting on the belt, which include the cylindrical shaped body portion 71 open at the upper and lower ends thereof, and with a perforate screen 72 adjacent the bottom thereof. This provides a compartment 74ᵃ which is open at the top of the cup for receiving an article of food therein for resting on the perforate screen bottom 72. An attaching flange 74 is provided as a part of each cup 70, which at diametrically opposed points thereon has pins 75 for the support of a T-shaped head or support 77 which is adapted to be slidably disposed in the slot or pocket 66 of the member 65. As is illustrated in Figure 10 of the drawings a plurality of these cups 70 may be arranged in each guide member 65, transversely of the belt 35. In lieu of the cups 70, when it is desired to use the cooking apparatus for French fried potatoes, or the like, a comb shaped member 77 is provided for each guide member 65; this comb 77 including a head 78 adapted for sliding in the pocket 66 of the members 65, and having outwardly extending spaced teeth 79 thereon which, of course, extend outwardly at right angles from the outer surface of the belt 35, substantially as is illustrated in the drawings.

The detachable guide member D is formed of sheet metal, and is adapted for disposition over the run 48 of the belt 35, to maintain the articles of food in their proper location with respect to the belt 35 as they are immersed in the liquid in the receptacle B. This member D is supported parallel with the run portion 48 of the belt, and at its forward end is arcuated, as at 80, concentric with the axis of the roller 37. At its rear end the member D is upturned, as at 81, and extends above the level of the fat or liquid in the receptacle B, which has been indicated by dotted line 82 in Figure 2 of the drawings. The member D is so supported in this location by means of supporting arms 83, which at their upper ends are hook shaped, as at 84, for resting upon the top edges 85 of the side walls of the vat B. Screws 86 may be provided for detachable connection of the upper ends of these arms 83 to the side walls 16 and 17 of the vat or receptacle B, substantially as is illustrated in Figure 5 of the drawings.

Referring to the operation of this invention, where it is desired to cook various articles of food stuffs merely by conveying said food stuffs about the belt 35 for one rotational movement thereof, the operator places the food stuffs on the run portion 45 of the belt C. If the article to be cooked is in the nature of French fried potatoes, the combs 77 are used, and the article is placed directly on the belt run 45 between these combs. If the articles to be cooked are doughnuts or fried cakes they are, of course, placed in the cups 70. The belt 35 during movement conveys the food stuffs into the liquid, below the level 82 thereof, and beneath the guide member D. It is of course the nature of some food stuffs to float, and it can readily be understood that the guide member D will prevent these food stuffs from getting out of their proper position with respect to the belt 35, and the food stuffs will of course be conveyed along and through the liquid in the vat B. The liquid in the vat B is, of course, boiling, since the cooking apparatus A is supported on the stove or burner E above the flames 85 thereof. The food stuffs will be properly guided around the roller 37, incident to the arcuate portions 80 and 26, and the food stuffs will be also guided along the bottom 15 of the vat B, as can readily be understood from Figure 2 of the drawings. As the food stuffs approach the roller 50 and pass the same they will be guided upwardly between the strainer or sediment screen 30 and the run 51 of the belt 35, and any crumbs or particles of foreign material will fall by gravity through the screen 30 into the sediment compartment 31. After passing off the screen 30 the articles of food arise above the liquid level of the tank or vat B, and pass over the wall 27 and from thence are forced onto the perforate strainer shelf 26. Any fat or liquid drippings will fall through the perforations of the shelf 26 and flow over the wall 25 for return to the compartment of the vat B through the perforations in the wall 27, as can readily be seen. Thus, the articles of food are cooked as they travel longitudinally through the vat B on the belt 35. In the majority of instances the speed of the belt 35 and the cooking temperature is such that it will only be necessary to convey the articles of food for one rotational movement with the belt 35. However, in some instances it will be necessary to continuously pass the articles of food about the belt 35 for several rotational movements thereof. To facilitate such movement of the articles of food stuff past the dispensing opening of the vat B, a guard shield 90 is preferably provided, which includes the arcuate body portion 91 having the flat end walls 92 thereon and depending attaching tongues 93. The depending attaching tongues 93 are adapted for reception through certain apertures in the shelf 26, and rests against the inside surface of the wall 27 substantially as is illustrated in Figure 6 of the drawings. When in this position the arcuate body portion 91 is concentrically arranged with the axis of the roller 40, and provides a guide so that the articles of food cannot be dispensed as they are lifted above the liquid level and pass the shelf 26, but said articles of food are properly guided above the roller 40, so that they will have a return movement over the run portion 45 of the belt 35. Certain lateral extending lugs 95 rest upon the dispensing shelf 26 to more stably support the shield or guide 90 in position.

From the foregoing description of this invention it is apparent that a cooking apparatus has been provided which will greatly facilitate cooking operations of such articles of food stuffs as above mentioned. The device is not solely adapted for the cooking of any particular class of foods, but is universal, so to speak, in its cooking function, and may receive food stuffs of different natures, shapes, and varying in other particulars. The device is sanitary in that no handling or manual turning of the food is required during the cooking operation. In order to maintain the grease or liquid in the vat B at a predetermined level a suitable grease gage may be provided. When the sediment compartment 31 is clogged the sediment may be easily removed through the opening 32. It is to be particularly noted that the parts of this invention are designed to permit the free circulation of cooking liquid. Thus, the belt 35 is of a perforate nature; the sediment screen 30 permits fats to pass therethrough; and the guide wall D is also preferably provided with minute perforations 91 therein. The boiling liquid may circulate through the cups 70, as the bottoms 72 thereof are perforate, and thus the articles of food will be kept under constant cooking temperature incident to travel through the compartment of the vat B.

Various changes in the shape, size, and arrangement of parts may be made to the form of the invention herein shown and described, without departing from the spirit of the invention or the scope of the claims.

I claim:

1. Cooking apparatus comprising a frame, a belt movably carried by said frame including transversely extending guide members having sockets provided therein, and food holding members having mounting members removably fitting into the sockets provided in said guide members.

2. Cooking apparatus comprising a frame, a conveyor rotatably supported by said frame including a perforate body portion and hollow guide members transversely carried by the body portion and having slots in their upper walls, and food holding members each including a cup, a base for said cup, and mounting means including a head fitting into the hollow guide member and arms extending from the base through the slot of the guide member and pivotally connected with said base.

3. Cooking apparatus comprising a frame, a conveyor movable in the frame, including hollow supporting members transversely carried thereby having slots therein, article receiving cups resting upon said supporting members, and mounting elements for said cups having heads fitting into the hollow supporting members, and arms extending from the heads through the slots of said supporting members and connected with the cups.

4. Cooking apparatus comprising a liquid receiving receptacle, conveyor means rotatably supported in the receptacle for travel longitudinally through the liquid therein, said receptacle so receiving the conveyor means that food stuffs on the conveyor means will be dispensed at the end of substantially a complete revolution of the conveyor means, and means for detachable support upon said receptacle for guiding food stuffs with the conveyor means for travel during a plurality of rotations with said conveyor means.

FRANK C. KRAMER.